Sept. 18, 1956  R. A. McCONNELL  2,763,838
CIRCUIT FOR OBTAINING THE RATIO OF TWO VOLTAGES
Filed Sept. 14, 1945
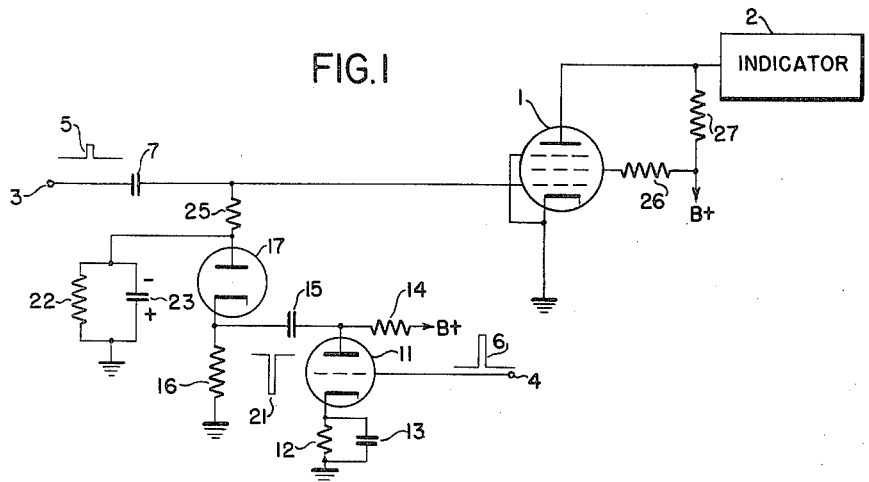
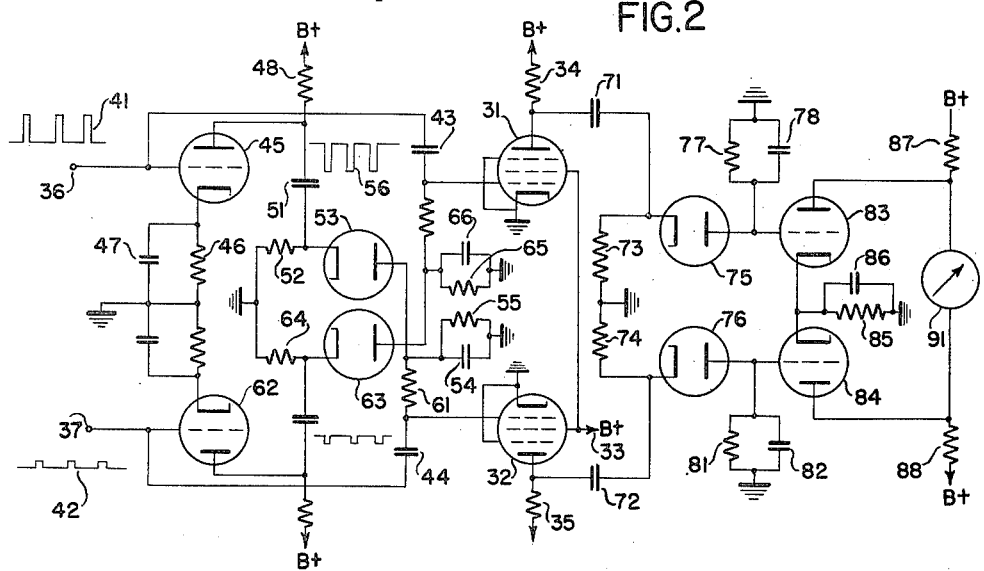
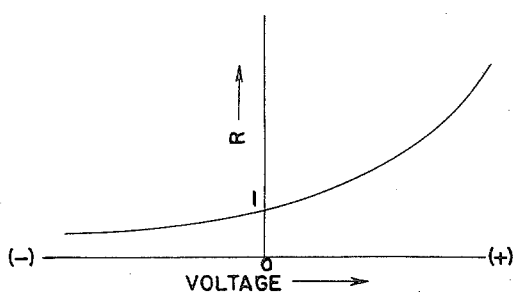
INVENTOR
ROBERT A. McCONNELL
BY
Ralph L Chappell
ATTORNEY

United States Patent Office 2,763,838
Patented Sept. 18, 1956

2,763,838

CIRCUIT FOR OBTAINING THE RATIO OF TWO VOLTAGES

Robert A. McConnell, Cambridge, Mass., assignor, by mesne assignments, to the United States of America as represented by the Secretary of the Navy Application September 14, 1945, Serial No. 616,405

2 Claims. (Cl. 324—140)

My invention relates in general to the field of electrical computing circuits, and more specifically relates to the problem of accurately determining the ratio of the amplitudes of two voltages.

An electrical computing circuit is basically one which performs a mathematical operation and provides an answer in the form of an instrument or indicator reading. An electrical circuit which automatically determines the ratio of the amplitudes of two voltages, independent of wave form has application in various arts. As an example, in a particular embodiment of a radio echo detection equipment, the ratio of reflection amplitudes from two distinct pulses may be utilized as an indication of range or altitude.

My invention contemplates an electron tube circuit of simplified design which provides upon an indicator a continuous reading, representative of the ratio of the peak amplitudes of two voltages or currents, independent of the wave form thereof. Successful operation of the circuit is readily obtained inasmuch as it is dependent solely upon the normally stable plate current and voltage characteristics of conventional type electron tubes. The indicating circuit provides wide ranges with sufficient accuracy and is readily adapted to provide an output reading of high sensitivity in the ratio range being determined.

It is therefore an object of my present invention to provide a novel electrical circuit which functions to generate a current proportional to the ratio of the amplitudes of two voltages.

It is another object of my invention to provide an electrical metering circuit of high sensitivity and accuracy, which is readily calibrated in terms of the ratio of two voltages, and independent of the wave form thereof.

A further object of my present invention is to provide an electrical computing circuit for determining the ratio of voltage amplitudes and having as a basis therefor, the particular transfer characteristics of a remote cutoff pentrode or similar electron tube amplifier.

These and other objects of my invention will now become apparent in the following detailed specification taken in connection with the accompanying drawings in which:

Fig. 1 is a schematic circuit diagram of the elements required for a basic ratio determining circuit;

Fig. 2 is a voltage ratio determining circuit of high sensitivity and accuracy, incorporating the basic features illustrated in Fig. 1; and Fig. 3 is a ratio calibration curve for the indicating circuit illustrated in Fig. 2.

Referring now to Fig. 1 there is illustrated the elements of a ratio determining circuit which comprise essentially, a conventional pentode amplifier 1, an indicator 2, and two input terminals 3 and 4. Two input signals 5 and 6 are applied to the input terminals 3 and 4 respectively and comprise for the particular example illustrated two voltages, which are a series of impulses, as for example the received signals of an echo detection system. The signal voltages 5 and 6 are both applied to the control grid of the normally unbiased pentode amplifier 1, which in accordance with the principles of my invention provides an output current in the indicator 2, directly proportional to the ratio of peak amplitudes of voltages 5 and 6. This result is obtained by the particular coupling system utilized for the voltages 5 and 6, and will now be described.

Thus, voltage 5, applied to input terminal 3, is directly coupled through blocking capacitor 7 to the control grid of the pentode amplifier 1. The signal voltage 6, with which voltage 5 is being compared, is used to fix the bias of the amplifier 1 at a value substantially proportional to the peak amplitude of the voltage 6. This is accomplished by first coupling the signal 6 to the control grid of a triode amplifier 11, having a conventional cathode biasing resistor 12 and capacitor 13. The plate of the amplifier 11 is returned to a positive power supply through load resistor 14 and is also coupled through capacitor 15 to a resistor 16 in the cathode circuit of a diode rectifier 17.

The signal coupled from the plate of the triode 11 to the resistor 16 is essentially an amplified voltage of wave form similar to the input signal 6, but of opposite phase as illustrated at 21. Thus, if a positive pulse is applied to the input terminal 4 a negative pulse appears at the cathode of diode 17. As herein illustrated, the diode 17 and its associated circuit components constitute a conventional sustaining circuit, which as is well understood in the art provides a substantially constant output voltage proportional to the peak of an input signal. The diode plate load circuit comprises the parallel combination of resistor 22 and capacitor 23 having a long time constant as compared to the period of the input signal 6. When the diode cathode is driven negative by an impulse as 21, a current flows up through cathode resistor 16 through the low, conductive impedance of the rectifier 17 and charges the capacitor 23 with polarity as illustrated. At the completion of the pulse 21, the cathode potential returns to normal ground potential and the diode 17 stops conducting. The capacitor 23 then discharges through the shunting resistor 22. The time constant as previously mentioned is large and will maintain the charge until the next impulse appears at the cathode of rectifier 17.

The negative potential appearing at the plate of the diode rectifier 17 is coupled through isolating resistor 25 to the control grid of the pentode amplifier 1, and it is thus evident that the bias thereat is proportional to the peak amplitude of the input signal 6.

The circuit illustrated will stabilize in a comparatively short period of time, at which point the bias on the pentode amplifier 1 is fixed and proportional to the amplitude of input signal 6, while the grid is pulsed about this bias point by the input signal 5. The screen grid and plate of the amplifier 1 are returned to a positive power supply through suitable load resistors 26 and 27, respectively. The plate circuit output, coupled to the indicator 2, is for the conditions of operation, proportional to the ratio of the peak amplitudes of voltages 5 and 6.

The operation of the circuit as described above has its basis in the particular type of mutual or transfer characteristic of a variable mu pentode or similar electron tube. Ordinarily a tube of this construction has, for fixed screen suppressor and plate potentials, a plate current characteristic which is substantially a logarithmic function of the input grid voltage. The basis of circuit operation may then be summarized as follows: For a tube having a logarithmic grid voltage-plate current characteristic, the ratio of two voltages will be obtained in the output circuit if one of these voltages is applied directly to the control grid of the tube and the other is employed to fix the bias thereof. This is demonstrated mathematically hereinbelow.

If the tube plate current $i_p$ is a logarithmic function of the applied grid voltage $e_g$, then, $$i_p = K \log e_g$$

where $K$ is a proportionality constant. The dynamic gain or transconductance of the tube is found by differentiation, thus, $$\frac{di_p}{de_g} = \frac{K}{e_g}$$

For an input grid voltage change $\Delta e_g$, the corresponding output current change is, $$\frac{di_p}{de_g}\Delta e_g = K\frac{\Delta e_g}{e_g}$$

Since $e_g$ is the bias voltage generated by and proportional to the peak of one of the input voltages, and $\Delta e_g$ is the other directly applied voltage, it is clear from this last equation that the output current is proportional to the voltage ratio.

The basic circuit illustrated in Fig. 1 has application to a wide variety of voltage wave forms and need not be limited to the pulse input illustrated. However, the particular voltage input will determine the nature of the coupling circuits used and the interstage amplifiers, as for example, 11. Thus if one of the voltages is D. C., this may be directly coupled through an isolating resistor to the control grid for the purpose of setting the circuit bias as previously described. If the pulses illustrated are sharp and contain an extreme number of high order harmonics the coupling circuits and amplifiers must, of course, be of conventional video design.

An extension of the basic principles illustrated in Fig. 1 is shown in the circuit of Fig. 2. This circuit utilzes a push-pull arrangement for obtaining the voltage ratio and thereby eliminates considerable error due to distortion and harmonics, and in addition, provides an output current which permits a determination of the voltage ratio with higher sensitivity and accuracy than that illustrated in Fig. 1. The logarithmic amplifiers which are the basis for ratio determination are the normally unbiased pentodes 31 and 32, the cathodes of which are grounded. The screen grids of amplifiers 31 and 32 are directly coupled to a positive voltage source 33. The plates of these amplifiers are returned to a positive voltage source through load resistors 34 and 35 respectively.

As in the case of Fig. 1, two input terminals 36 and 37 are provided for the application of the voltages to be measured. The input signals are again represented as trains of video impulses, 41 and 42, and are each directly coupled through capacitors 43 and 44, to the control grids of logarithmic amplifiers 31 and 32, respectively. The operating grid bias of logarithmic amplifier 31 is made proportional to the amplitude of input signal 42 and correspondingly the operating bias of amplifier 32 is made proportional to the peak amplitude of input signal 41. Thus the input signal 41 is also coupled to the control grid of a triode amplifier 45, having a cathode bias resistor 46 and capacitor 47. The triode plate is returned to a positive voltage source through load resistor 48 and is also coupled through capacitor 51 to a resistor 52 in the cathode circuit of a diode rectifier 53. The rectifier 53 is an element of a sustaining circuit which includes the parallel combination of capacitor 54 and resistor 55 of comparatively long time constant. The application of a positive pulse at terminal 36 thus drives the control grid of logarithmic amplifier 31 positive while simultaneously driving the cathode of rectifier 53 negatively as illustrated by the voltage output 56 in the plate circuit of triode amplifier 45. A negative impulse when applied to the cathode resistor 52 results in current flow through diode 53 which charges capacitor 54 with polarity as illustrated and accordingly applies a negative bias through isolating resistor 61 to the control grid of logarithmic amplifier 32.

In a like manner the signal applied at terminal 37 is directly coupled to the control grid of amplifier 32 while simultaneously providing a negative bias for amplifier 31 which is proportional to the peak amplitude of the signal input. In the biasing circuit, cathode biased triode amplifier 62 corresponds to triode amplifier 45 and the sustaining circuit comprising the diode rectifier 63, cathode resistor 64, and resistor-capacitor combinations 65 and 66 provide a bias proportional to the peak amplitude of the input voltage 42. The output signal of logarithmic amplifier 31 is, in accordance with the principles described and proved in connection with Fig. 1, directly proportional to the ratio of the peak amplitude of voltage 41 to the peak amplitude of voltage 42 and the signal output of logarithmic amplifier 32 is proportional to the reciprocal of this ratio. These output signals comprise pulsating currents which are coupled by capacitors 71 and 72 from the logarithmic amplifiers to the cathode resistors 73 and 74 of the rectifiers 75 and 76 respectively. The diode 75 has a plate load resistor 77 shunted by a sustaining capacitor 78. Diode detector 76 also has a plate load circuit comprising a resistor 81 shunted by capacitor 82. The voltages developed across resistors 77 and 81 and smoothed by capacitors 78 and 82 respectively are applied to the control grid of a pair of triode amplifiers 83 and 84 connected in push-pull. The cathodes of the push-pull triodes are biased by a common resistor 85 shunted by a filter capacitor 86. The plates of these amplifier tubes are returned to a positive voltage supply through load resistors 87 and 88 and are in addition interconnected by a sensitive instrument 91 which provides an indication proportional to the ratio of the two voltages 41 and 42.

As previously described, the voltage input to the control grid of amplifier 83 is a fixed negative voltage proportional to the ratio of voltages 41 and 42. The negative voltage applied to the control grid of amplifier 84 is proportional to the inverse of this ratio. Since the meter 91 is differentially connected in the plate circuit of amplifiers 83 and 84, the indication is therefore proportional to the desired voltage ratio minus the inverse thereof. Under these conditions, the meter 91 will read zero for a ratio equal to one. A positive voltage will be applied to the meter terminals for voltage ratios greater than one, and a negative voltage will be applied thereto for voltage ratios less than one. Accordingly, a center scale movable pointer instrument may be utilized to directly indicate, upon proper calibration, the value of the ratio, and whether the ratio is greater or less than unity. If a conventional instrument movement is used, having a scale calibrated in one direction only, then a reversing switch may be connected to the meter terminal so that the meter will read ratios greater than unity as deflection up-scale for one setting of the switch and ratios less than unity for similar deflection with the opposite switch setting.

Fig. 3 illustrates a typical calibration curve of the voltage ratio measuring circuit illustrated in Fig. 2. The value of the ratio is plotted as a function of positive and negative voltage applied to the differentially connected instrument 91. At zero voltage the ratio, R, is one. For increasingly positive voltages, the ratio is greater than unity and for voltages increasing in a negative direction the ratio is less than one. Greatest sensitivity and accuracy will be obtained for ratios of the order of one to one. If the instrument 91 is supplied with a calibrated series of multipliers, an increased range of ratio reading is readily obtainable with fairly constant accuracy throughout this range.

The instrument calibration curve as illustrated in Fig. 3 has a definite curvature which is constant in form for all linearly calibrated indicating instruments 91. Thus the calibration card upon a center scale indicator 91 may be subdivided as determined by the calibration curve of Fig. 3 for a particular instrument multiplier, and for other multipliers a simple multiplying factor may be used to convert to true ratio values.

The voltage ratio circuit illustrated in Fig. 2 has the advantage of rapid accurate calibration since it is essentially independent of the voltage wave form. Thus if the two terminals 36 and 37 are electrically connected so that a single pulsating or alternating calibrating voltage is applied to both channels of the push-pull system, the indicating instrument 91 should have zero applied voltage. If in error, it is possible to properly set the reading by a variation of any of the circuit components which determine the gain of either or both channels. For example, the diode cathode resistors 52 and 64 may be adjusted for proper calibration. For further calibration of the instrument, a simple resistive voltage dividing network of the type utilized in connection with potentiometer calibration may be used to provide input voltages at terminals 36 and 37 of known ratio. If a ratio of ten to one, for example, is calibrated upon the instrument 91, and the terminals 36 and 37 are reversed, a ratio of one to ten may be calibrated. Also, the calibration may be checked by reversing the leads connecting the instrument 91 to see that the reading is equal to the reciprocal of the known ratio.

The circuit illustrated in Fig. 2 has been described in connection with voltage inputs comprising a train of video impulses. It is quite evident that by proper adaptation of the coupling and detection circuits that a voltage of any wave form may be applied and a proper ratio indication obtained. With suitably coupled input amplifiers a comparison of direct voltages may also be made. This, of course, involves the elimination of the coupling capacitors 43 and 44. The input voltages need not be of the same phase for comparison purposes since ultimately these voltages are rectified and a comparison is made of substantially constant voltages wherein phase is no consideration. If distorted wave forms are supplied to the input circuits of the ratio circuit, it may be desirable to obtain first an indication of the ratio of positive peak voltages and another indication have the ratio of negative peak voltages. As is evident from the circuit, the factor which determines the voltage peak used for the comparison circuit is that peak which drives the cathode of the diode rectifier 53 in a negative direction. By the suitable incorporation of amplifiers, prior to this sustaining circuit, the phase of the voltage at this point may be adjusted so that the desired positive or negative peak is supplied to the logarithmic amplifiers for comparison purposes.

It is thus evident that many modifications of the foregoing disclosure will be apparent to those skilled in the art. I prefer, therefore, not to be bound by these specific disclosures, but by the spirit and scope of the appended claims.

What is claimed is:

1. A circuit for indicating the ratio of the peak amplitudes of first and second alternating signals comprising, first and second variable amplification factor pentode electron tubes each having a logarithmic plate current-control grid voltage transfer characteristic, means for directly applying said first and second signals to the control grids of said first and second electron tubes, respectively, first and second peak detectors, means for applying said first and second signals to said first and second peak detectors, respectively, said first and second detectors being arranged respectively to produce first and second direct voltages of a magnitude proportional to the peak amplitudes of said first and second alternating signals, means respectively coupling said first and second direct voltages to the control grids of said second and first pentode tubes whereby the plate currents of said first and second tubes are respectively directly and inversely proporitonal to the ratio of the peak amplitude of said first and second alternating signals, third and fourth peak detectors respectively connected to the plates of said first and second pentode tubes for producing third and fourth direct voltages respectively proportional to the plate currents of said first and second tubes, and an indicator coupled to said detectors for indicating the difference in magnitude of said third and fourth direct voltages.

2. A circuit for indicating the ratio of the peak amplitude of first and second pulse signals comprising, first and second variable amplification factor pentode electron tubes each having a logarithmic plate current-grid voltage transfer characteristic, means for respectively directly applying said first and second pulse signals to the control grids of said first and second electron tubes, first and second peak detectors each including a long time constant sustaining circuit, means for respectively applying said first and second pulse signals to said first and second peak detectors, said first and second detectors being arranged respectively to produce first and second direct voltages of a magnitude continuously proportional to the peak amplitudes of said first and second pulse signals, means respectively coupling said first and second direct voltages as a bias to the control grids of said second and first pentode tubes whereby the plate currents of said first and second tubes are respectively directly and inversely proportional to the ratio of the peak amplitude of said first and second pulse signals, third and fourth peak detectors respectively connected to the plates of said first and second pentode tubes for producing third and fourth direct voltages proportional to the plate currents of said first and second tubes, and an indicator coupled to said third and fourth detectors for indicating the difference in magnitude of said third and fourth direct voltages, said difference being continuously proportional to the ratio of the peak amplitudes of said first and second pulse signals.

References Cited in the file of this patent

UNITED STATES PATENTS

| Number | Name | Date |
|---|---|---|
| 2,141,343 | Campbell | Dec. 27, 1938 |
| 2,222,172 | Dimmick | Nov. 19, 1940 |
| 2,244,369 | Martin | June 3, 1941 |
| 2,248,563 | Hanns-Heinz Wolff | July 8, 1941 |
| 2,270,773 | Sonnentag | Jan. 20, 1942 |
| 2,273,978 | Montgomery | Feb. 24, 1942 |
| 2,281,995 | Purington | May 5, 1942 |
| 2,287,174 | Heising | June 23, 1942 |
| 2,306,456 | Mayne | Dec. 29, 1942 |
| 2,313,666 | Petterson | Mar. 9, 1943 |
| 2,314,851 | Barney | Mar. 23, 1943 |
| 2,331,360 | Tuckerman | Oct. 12, 1943 |
| 2,397,540 | Dome | Apr. 2, 1946 |
| 2,397,830 | Bailey | Apr. 2, 1946 |
| 2,400,326 | Wolf | May 14, 1946 |
| 2,419,852 | Owen | Apr. 29, 1947 |